(12) United States Patent
Bailey et al.

(10) Patent No.: US 11,684,056 B1
(45) Date of Patent: Jun. 27, 2023

(54) TACKLE BOX AND LIVE BAIT WELL

(71) Applicants: Adam Bailey, Marlborough, MA (US); Plutarco Castellanos, Marlborough, MA (US)

(72) Inventors: Adam Bailey, Marlborough, MA (US); Plutarco Castellanos, Marlborough, MA (US)

( * ) Notice: Subject to any disclaimer, the term of this patent is extended or adjusted under 35 U.S.C. 154(b) by 0 days.

(21) Appl. No.: 17/543,913

(22) Filed: Dec. 7, 2021

(51) Int. Cl.
*A01K 97/00* (2006.01)
*A01K 97/05* (2006.01)
*A01K 97/06* (2006.01)

(52) U.S. Cl.
CPC .............. *A01K 97/05* (2013.01); *A01K 97/06* (2013.01)

(58) Field of Classification Search
CPC ........ A01K 97/04; A01K 97/05; A01K 97/06; A01K 97/22
See application file for complete search history.

(56) References Cited

U.S. PATENT DOCUMENTS

| | | |
|---|---|---|
| 2,870,932 A | 1/1959 | Davis |
| 3,499,244 A | 3/1970 | Malone |
| 4,128,170 A | 12/1978 | Elliott |
| 4,541,539 A | 9/1985 | Matthews |
| 5,864,981 A | 2/1999 | Zeman |
| 8,806,803 B1* | 8/2014 | Mitchell ................ A01K 97/06 43/54.1 |
| D890,458 S | 7/2020 | Yearwood |
| 2007/0051031 A1* | 3/2007 | Allen ..................... A01K 97/06 43/54.1 |
| 2008/0110079 A1 | 5/2008 | Jeffries |
| 2009/0064565 A1* | 3/2009 | Sloop ..................... A01K 97/05 43/57 |
| 2017/0045217 A1* | 2/2017 | Bowden .................. F21V 33/00 |
| 2017/0118968 A1* | 5/2017 | Gimesky ................ A01K 97/05 |
| 2018/0049420 A1* | 2/2018 | Dollahite ............... A01K 97/06 |

FOREIGN PATENT DOCUMENTS

WO 2004099015 11/2004

* cited by examiner

*Primary Examiner* — Joshua J Michener
*Assistant Examiner* — Henry Hooper Mudd

(57) ABSTRACT

The tackle box and live bait well comprises a tackle box, a live bait well, an air supply, and a lighting system. The tackle box, the live bait well, the air supply, and the lighting system may be contained within a housing that may be carried by a user. The tackle box may be operable to store tackle. As non-limiting examples, the tackle may comprise hooks, sinkers, bobbers, swivels, and/or fishing line. The live bait well may be a container for carrying live bait in water. The air supply may keep the water in the live bait well oxygenated. The lighting system may provide illumination when the tackle box and live bait well is used in dim lighting.

16 Claims, 5 Drawing Sheets

TACKLE BOX AND LIVE BAIT WELL

TITLE OF INVENTION

Tackle box and live bait well

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fishing equipment, more specifically, a tackle box and live bait well.

SUMMARY OF INVENTION

The tackle box and live bait well comprises a tackle box, a live bait well, an air supply, and a lighting system. The tackle box, the live bait well, the air supply, and the lighting system may be contained within a housing that may be carried by a user. The tackle box may be operable to store tackle. As non-limiting examples, the tackle may comprise hooks, sinkers, bobbers, swivels, and/or fishing line. The live bait well may be a container for carrying live bait in water. The air supply may keep the water in the live bait well oxygenated. The lighting system may provide illumination when the tackle box and live bait well is used in dim lighting.

An object of the invention is to provide a tackle box and a live bait well in a single housing that may be carried by a user.

Another object of the invention is to provide a top storage tray and a plurality of drawers for storing tackle.

A further object of the invention is to provide an air supply that pumps air into water in the live bait well to keep the water oxygenated.

Yet another object of the invention is to provide a lighting system to illuminate the area adjacent to the invention in dim lighting.

These together with additional objects, features and advantages of the tackle box and live bait well will be readily apparent to those of ordinary skill in the art upon reading the following detailed description of the presently preferred, but nonetheless illustrative, embodiments when taken in conjunction with the accompanying drawings.

In this respect, before explaining the current embodiments of the tackle box and live bait well in detail, it is to be understood that the tackle box and live bait well is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tackle box and live bait well.

It is therefore important that the claims be regarded as including such equivalent construction insofar as they do not depart from the spirit and scope of the tackle box and live bait well. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
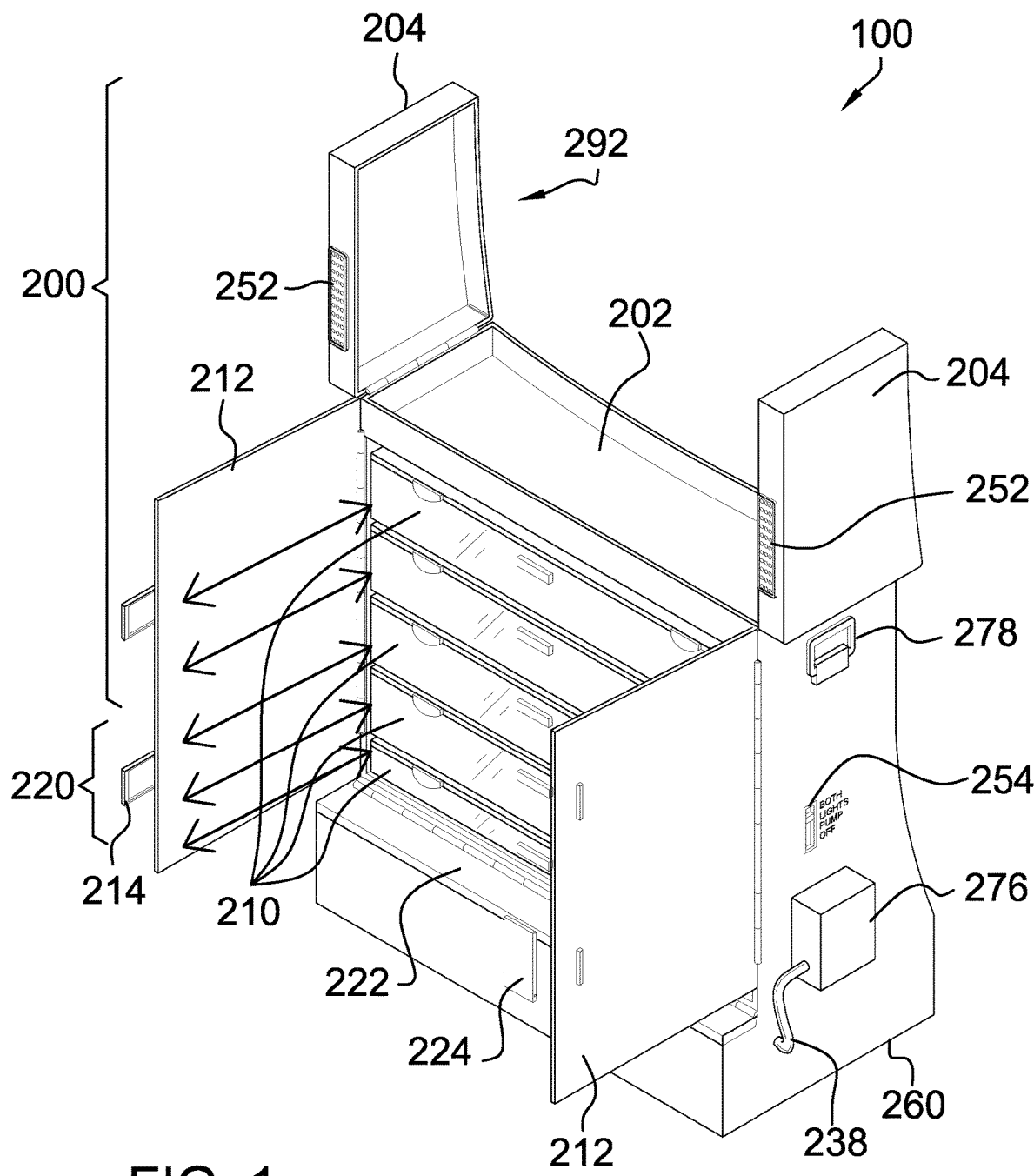
FIG. 1 is a front isometric view of an embodiment of the disclosure.
Figure 2:
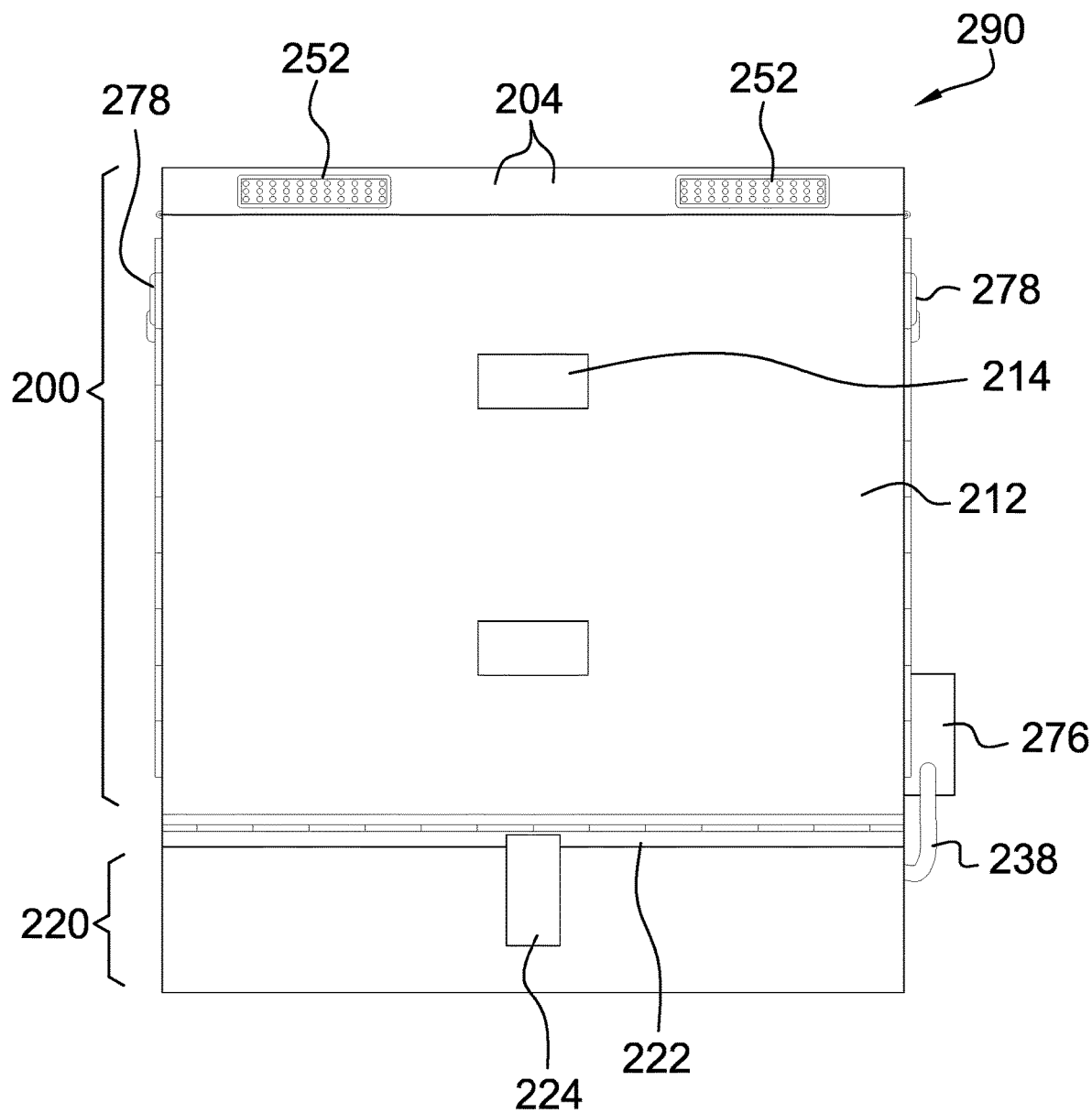
FIG. 2 is a front view of an embodiment of the disclosure.
Figure 3:
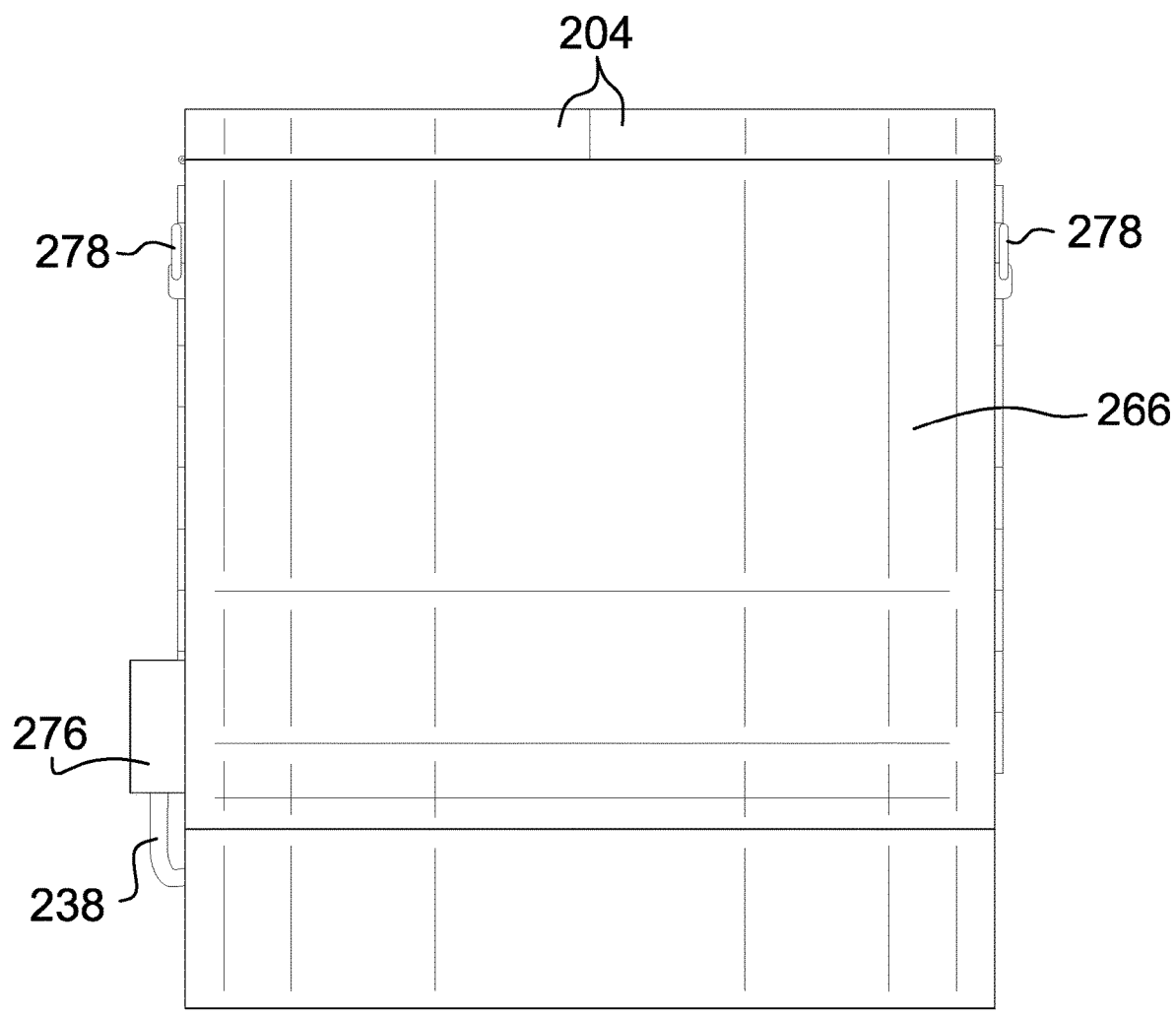
FIG. 3 is a rear view of an embodiment of the disclosure.
Figure 4:
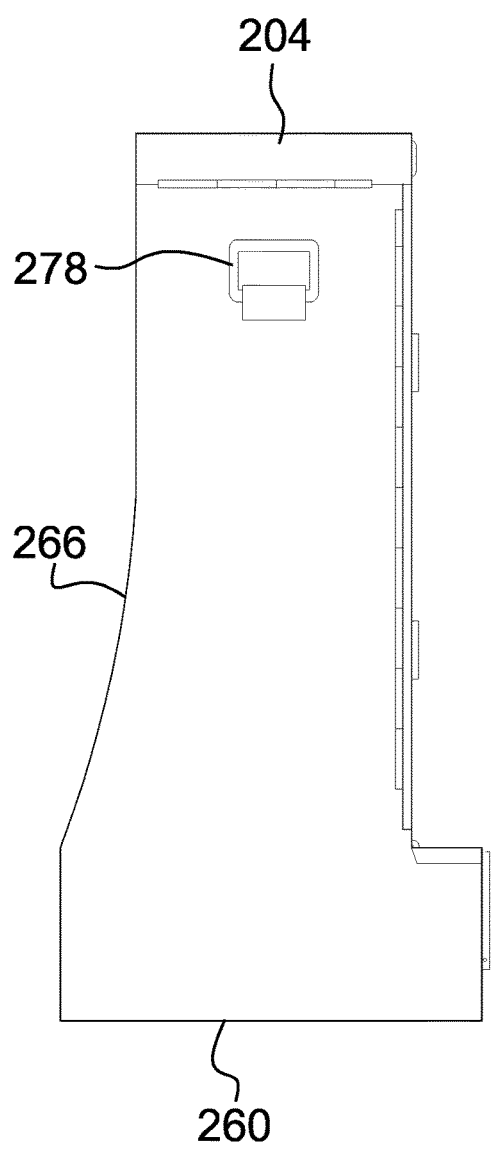
FIG. 4 is a left side view of an embodiment of the disclosure.
Figure 5:
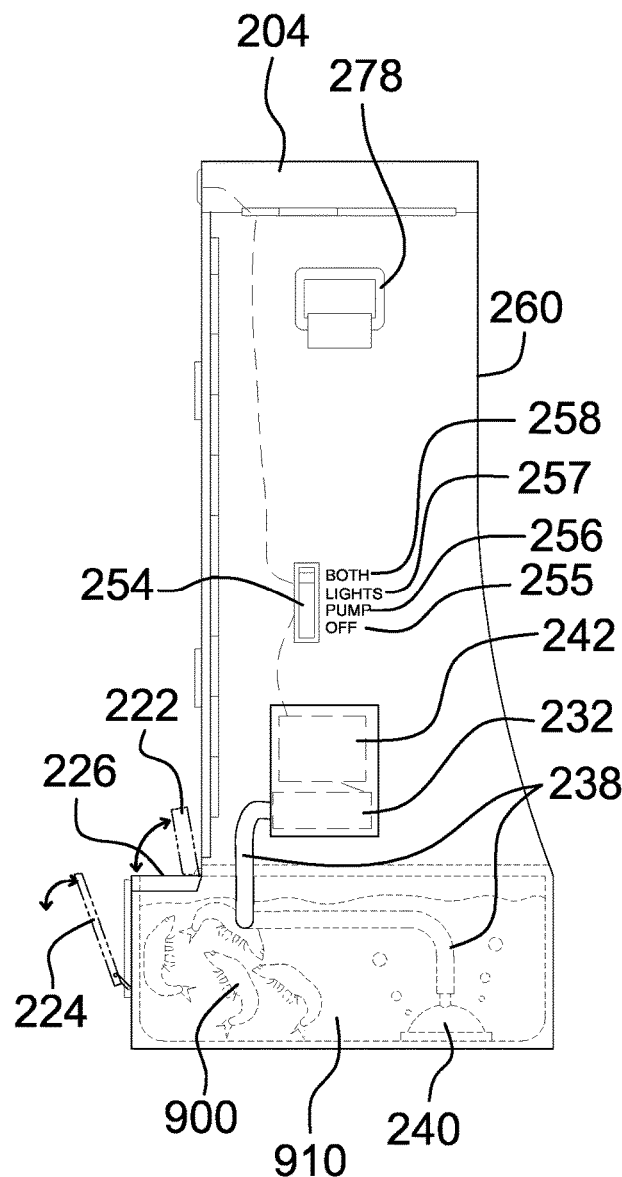
FIG. 5 is a right side view of an embodiment of the disclosure.
Figure 6:
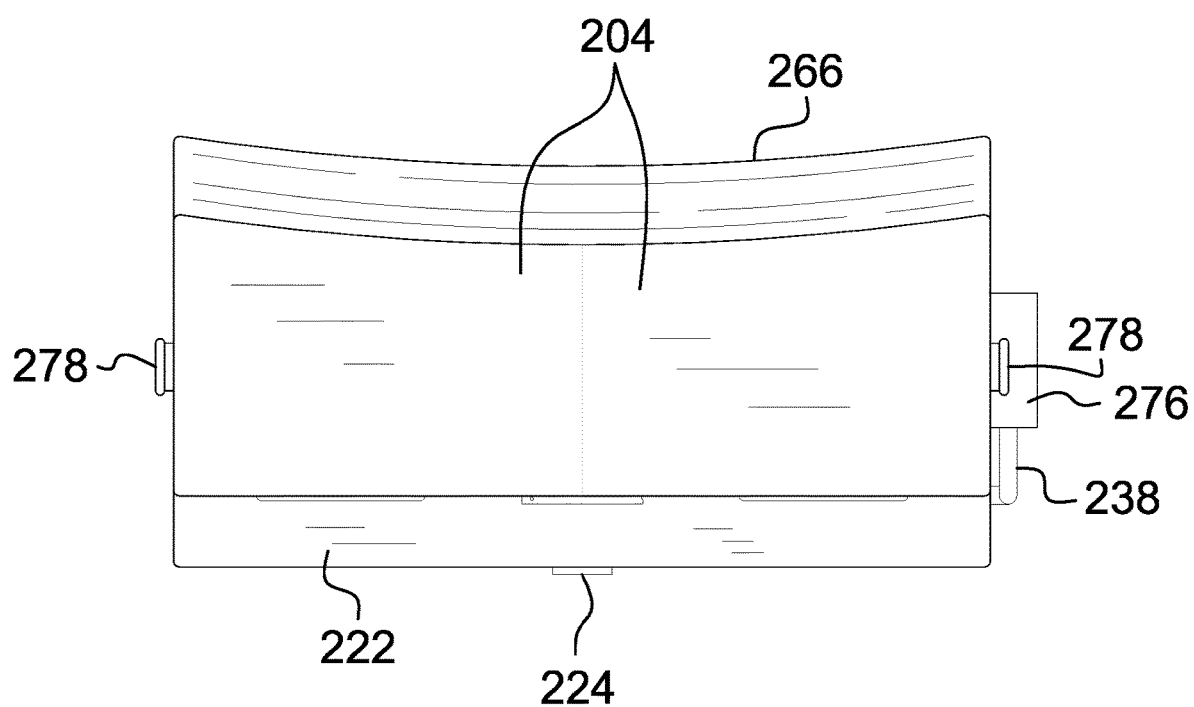
FIG. 6 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 6.

The tackle box and live bait well 100 (hereinafter invention) comprises a tackle box 200, a live bait well 220, an air supply, and a lighting system. The tackle box 200, the live bait well 220, the air supply, and the lighting system may be contained within a housing 260 that may be carried by a user. The tackle box 200 may be operable to store tackle. As non-limiting examples, the tackle may comprise hooks, sinkers, bobbers, swivels, and/or fishing line. The live bait well 220 may be a container for carrying live bait 900 in water 910. The air supply may keep the water 910 in the live bait well 220 oxygenated. The lighting system may provide illumination when the invention 100 is used in dim lighting.

Throughout this document, "front" may refer to the side of the housing 260 from which a plurality of drawers 210 are accessible and "rear" may refer to the curved side of the housing 260 that is opposite the front. "Left" and "right" are stated with respect to the user located on the front side of the invention 100. "Left" is to the user's left and "right" is to the user's right. As a non-limiting example, FIG. 1 illustrates an operator control 254 and a pump cover 276 located on the right side of the housing 260.

The tackle box 200 may comprise a top storage tray 202 and the plurality of drawers 210. The top storage tray 202 and the plurality of drawers 210 may be covered when not in use to prevent loss of the tackle.

The top storage tray 202 may be an open-top bin for storing the tackle. The top storage tray 202 may comprise four side walls and a bottom. The top storage tray 202 may be located at the top of the housing 260.

Top flip up lids 204 may be a pair of half-lids that cover the top of the tackle box 200 when closed. The top flip up lids 204 may be hingedly coupled to the top sides of the tackle box 200 such that the top flip up lids 204 may cover the top storage tray 202 when the top flip up lids 204 are in a lid closed position 290. The top flip up lids 204 may provide access to the top storage tray 202 when the top flip up lids 204 are in a lid open position 292.

The plurality of drawers 210 may be horizontally-oriented open-top containers that may be operable to hold the tackle. The plurality of drawers 210 may slide in and out of the tackle box 200 at the front of the tackle box 200. The plurality of drawers 210 may be supported within the tackle box 200 by full or partial shelves.

One or more doors 212 may prevent the plurality of drawers 210 from sliding out of the tackle box 200 when the plurality of drawers 210 are not in use. The one or more doors 212 may be hingedly coupled to the housing 260 of the tackle box 200 such that the one or more doors 212 swing out away from the tackle box 200 to expose the plurality of drawers 210. The one or more doors 212 may comprise one or more door latches 214 in order to hold the one or more doors 212 closed.

The live bait well 220 may be a container for holding the live bait 900 and the water 910 that the live bait 900 live in. The live bait well 220 may be located at the bottom of the housing 260, beneath the tackle box 200. The live bait well 220 may have a larger footprint than the tackle box 200 and may therefore extend beyond the tackle box 200 at the front of the housing 260. A bait well lid 222 may cover the extension of the live bait well 220. The bait well lid 222 may be hingedly coupled to the housing 260 such that pivoting the bait well lid 222 open uncovers a live bait well access aperture 226 through which the live bait 900 may be removed from the live bait well 220.

A bait well lid latch 224 may restrain the bait well lid 222 from opening except when unlatched to remove the live bait 900. The bait well lid latch 224 may restrain the bait well lid 222 to the housing 260.

The air supply may comprise an air pump 232, an air hose 238, and an air bubbler 240. The air supply may pump air through the water 910 in the live bait well 220 to oxygenate the water 910.

The air pump 232 may pull the air in through an air intake and force the air out through the air hose 238 that is coupled to a pump outlet. The air pump 232 may be electromechanical and may comprise an internal electric motor that may be energized by the application of an electrical potential to the air pump 232. As non-limiting examples, the air pump 232 may move the air by applying rotary motion, reciprocating motion, linear motion, or a combination thereof to one or more gears, screws, pistons, shuttle blocks, vanes, diaphragms, plungers, impellers, or combinations thereof. The air pump 232 may be housed within the pump cover 276 on the side of the tackle box 200 where the air pump 232 is above the water level of the live bait well 220. The air hose 238 may be a conduit for moving the air from the air pump 232 to the air bubbler 240.

The air bubbler 240 may be a diffuser for introducing the air into the water 910 in the form of minuscule bubbles. The air bubbler 240 may be located within the live bait well 220 at the bottom of the live bait well 220.

The invention 100 may further comprise a battery 242. The battery 242 may comprise one or more energy-storage devices. The battery 242 may be a source of electrical energy to operate the air pump 232 and the lighting system. The battery 242 may be rechargeable and/or replaceable.

The lighting system may illuminate in front of the housing 260 so that the top storage tray 202, the plurality of drawers 210, and the live bait well 220 are usable after sunset. The lighting system may comprise one or more led lights 252. In a preferred embodiment, the one or more led lights 252 may be coupled to the exterior front of the top flip up lids 204.

The operator control 254 coupled to an exterior side of the housing 260 may control the air pump 232 and the lighting system. The operator control 254 may comprise an OFF position 255. When the operator control 254 is moved to the OFF position 255, the air pump 232 and the lighting system may be de-energized as the operator control 254 blocks the conduction of the electrical potential from the battery 242 to both the air pump 232 and the lighting system. The operator control 254 may comprise a PUMP position 256. When the operator control 254 is moved to the PUMP position 256, the air pump 232 only may be energized by conducting the electrical potential from the battery 242 through the operator control 254 to the air pump 232. The operator control 254 may comprise a LIGHTS position 257. When the operator control 254 is moved to the LIGHTS position 257, the lighting system only may be energized by conducting the electrical potential from the battery 242 through the operator control 254 to the lighting system. The operator control 254 may comprise a BOTH position 258. When the operator control 254 is moved to the BOTH position 258, both the air pump 232 and the lighting system may be energized by conducting the electrical potential from the battery 242 through the operator control 254 to the air pump 232 and the lighting system.

The housing 260 may be a single enclosure for both the tackle box 200 and the live bait well 220. The housing 260 may be adapted to be carried by the user. The housing 260 may comprise strap attachment loops 278 for coupling shoulder straps to the housing 260. The strap attachment loops 278 may be located at the top of both sides of the housing 260.

The rear side of the housing 260 may be adapted to conform to the shape of the use's back by virtue of a contoured surface 266. As a non-limiting example, the rear side of the housing 260 may follow a concave curve from left to right so that the weight of the invention 100 is distributed over the user's back instead of pressing against the user's spine.

In use, the tackle may be placed into the plurality of drawers 210 and the top storage tray 202. The water 910 and the live bait 900 may be placed into the live bait well 220. The top flip up lids 204 and the one or more doors 212 may be closed and latched to prevent the tackle from falling out of the housing 260. The operator control 254 may be placed in the PUMP position 256 to begin oxygenation of the water 910 in the live bait well 220. The bait well lid 222 may be closed and latched to prevent the live bait 900 or the water 910 from falling out of the live bait well 220. The invention 100 may be carried to a fishing spot and placed on the ground. The tackle may be retrieved from the plurality of drawers 210 and the top storage tray 202 as needed. The live bait 900 may be removed from the live bait well 220 via the live bait well access aperture 226 as needed. The lighting system may be illuminated by moving the operator control 254 to either the LIGHTS position 257 or to the BOTH position 258.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, "concave" may be used to describe a surface that resembles the interior surface of a sphere or a portion thereof.

As used herein, the words "couple", "couples", "coupled" or "coupling", may refer to connecting, either directly or indirectly, and does not necessarily imply a mechanical connection.

As used in this disclosure, an "electric motor" may be a device that converts electric energy into rotational mechanical energy.

As used in this disclosure, the word "exterior" may be used as a relational term that implies that an object is not located or contained within the boundary of a structure or a space.

As used here, "footprint" may refer to a vertical, downward projection of an object onto the surface that supports the object. The portion of the supporting surface that is within the footprint is, by definition, underneath the object.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, a "housing" may be a rigid or semi-rigid casing that encloses and protects one or more devices.

As used in this disclosure, an "LED" may be an acronym for a light emitting diode. An LED allows current to flow in one direction and when current is flowing the LED emits photons. The wavelength of the light that is emitted may be in the visible range of the spectrum or may extend into either the infrared (IR) spectral range or the ultraviolet (UV) spectral range. The brightness of the LED can be increased and decreased by controlling the amount of current flowing through the LED. Multiple LEDs having different emission spectrums may be packaged into a single device to produce a multi-color LED. A broad range of colors may be produced by multi-color LEDs by selecting which of the multiple LEDs are energized and by controlling the brightness of each of the multiple LEDs. Organic LEDs (OLEDs) are included in this definition.

As used in this disclosure, a "pump" may be a mechanical or electromechanical device that uses suction or pressure to raise or move fluids, compress fluids, or force a fluid into an inflatable object. As non-limiting examples, fluids may include both liquids, such as water, and gases, such as air.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tackle box and live bait well comprising:

A tackle box, a live bait well, an air supply, and a lighting system;

wherein the tackle box, the live bait well, the air supply, and the lighting system are contained within a housing that is adapted to be carried by a user;

wherein the tackle box is operable to store tackle;

wherein the live bait well is a container for carrying live bait in water;

wherein the air supply keeps the water in the live bait well oxygenated;

wherein the lighting system provides illumination when the tackle box and live bait well is used in dim lighting;

wherein the tackle box comprises a top storage tray and a plurality of drawers;

wherein the top storage tray and the plurality of drawers are covered when not in use to prevent loss of the tackle;

wherein top flip up lids are a pair of half-lids that cover the top of the tackle box when closed;

wherein the top flip up lids are hingedly coupled to the top sides of the tackle box such that the top flip up lids cover the top storage tray when the top flip up lids are in a lid closed position;

wherein the top flip up lids provide access to the top storage tray when the top flip up lids are in a lid open position;

wherein the air supply comprises an air pump, an air hose, and an air bubbler;

wherein the air supply pumps air through the water in the live bait well to oxygenate the water;

wherein the air bubbler is a diffuser for introducing the air into the water in the form of bubbles;

wherein the air bubbler is located within the live bait well at the bottom of the live bait well.

2. The tackle box and live bait well according to claim 1 wherein the top storage tray is an open-top bin for storing the tackle;

wherein the top storage tray comprises four side walls and a bottom;

wherein the top storage tray is located at the top of the housing.

3. The tackle box and live bait well according to claim 2 wherein the plurality of drawers are horizontally-oriented open-top containers that are operable to hold the tackle;

wherein the plurality of drawers slide in and out of the tackle box at the front of the tackle box;

wherein the plurality of drawers are supported within the tackle box by full or partial shelves.

4. The tackle box and live bait well according to claim 3 wherein one or more doors prevent the plurality of drawers from sliding out of the tackle box when the plurality of drawers are not in use;

wherein the one or more doors are hingedly coupled to the housing of the tackle box such that the one or more doors swing out away from the tackle box to expose the plurality of drawers;

wherein the one or more doors comprise one or more door latches in order to hold the one or more doors closed.

5. The tackle box and live bait well according to claim 4 wherein the live bait well is a container for holding the live bait and the water that the live bait live in;

wherein the live bait well is located at the bottom of the housing, beneath the tackle box;

wherein the live bait well has a larger footprint than the tackle box and extends beyond the tackle box at the front of the housing;

wherein a bait well lid covers the extension of the live bait well;

wherein the bait well lid is hingedly coupled to the housing such that pivoting the bait well lid open uncovers a live bait well access aperture through which the live bait is removed from the live bait well.

6. The tackle box and live bait well according to claim 5 wherein the air pump pulls the air in through an air intake and force the air out through the air hose that is coupled to a pump outlet;

wherein the air pump is electromechanical and comprises an internal electric motor that is energized by the application of an electrical potential to the air pump.

7. The tackle box and live bait well according to claim 6 wherein the air pump moves the air by applying rotary motion, reciprocating motion, linear motion, or a combination thereof to one or more gears, screws, pistons, shuttle blocks, vanes, diaphragms, plungers, impellers, or combinations thereof;

wherein the air pump is housed within a pump cover on the side of the tackle box where the air pump is above the water level of the live bait well;

wherein the air hose is a conduit for moving the air from the air pump to the air bubbler.

8. The tackle box and live bait well according to claim 7 wherein the tackle box and live bait well further comprises a battery;

wherein the battery comprises one or more energy-storage devices;

wherein the battery is a source of electrical energy to operate the air pump and the lighting system;

wherein the battery is rechargeable and/or replaceable.

9. The tackle box and live bait well according to claim 8 wherein the lighting system illuminates in front of the housing so that the top storage tray, the plurality of drawers, and the live bait well are usable after sunset;

wherein the lighting system comprises one or more led lights.

10. The tackle box and live bait well according to claim 9 wherein the one or more led lights are coupled to the exterior front of the top flip up lids.

11. The tackle box and live bait well according to claim 9 wherein an operator control coupled to an exterior side of the housing controls the air pump and the lighting system;

wherein the operator control comprises an OFF position;

wherein when the operator control is moved to the OFF position, the air pump and the lighting system are de-energized as the operator control blocks the conduction of the electrical potential from the battery to both the air pump and the lighting system.

12. The tackle box and live bait well according to claim 11 wherein the operator control comprises a PUMP position;

wherein when the operator control is moved to the PUMP position, the air pump only is energized by conducting the electrical potential from the battery through the operator control to the air pump.

13. The tackle box and live bait well according to claim 12 wherein the operator control comprises a LIGHTS position;

wherein when the operator control is moved to the LIGHTS position, the lighting system only is energized by conducting the electrical potential from the battery through the operator control to the lighting system.

14. The tackle box and live bait well according to claim 13 wherein the operator control comprises a BOTH position;

wherein when the operator control is moved to the BOTH position, both the air pump and the lighting system are energized by conducting the electrical potential from the battery through the operator control to the air pump and the lighting system.

15. The tackle box and live bait well according to claim 14 wherein the housing is a single enclosure for both the tackle box and the live bait well;

wherein the housing is adapted to be carried by the user;

wherein the housing comprises strap attachment loops for coupling shoulder straps to the housing;

wherein the strap attachment loops are located at the top of both sides of the housing.

16. The tackle box and live bait well according to claim 15 wherein the rear side of the housing is adapted to conform to the shape of the use's back by virtue of a contoured surface.

* * * * *